(12) United States Patent
Bowman

(10) Patent No.: US 6,379,543 B1
(45) Date of Patent: Apr. 30, 2002

(54) WATER TREATMENT SYSTEM

(75) Inventor: Martin Bowman, Cottesloe (AU)

(73) Assignee: Ecologic Holdings Pty Limited, Canning Vale (AU)

( * ) Notice: Subject to any disclaimer, the term of this patent is extended or adjusted under 35 U.S.C. 154(b) by 0 days.

(21) Appl. No.: 09/396,168

(22) Filed: Sep. 14, 1999

(30) Foreign Application Priority Data

Feb. 26, 1999 (AU) .............................................. PP 8946

(51) Int. Cl.[7] .................................................. C02F 1/28
(52) U.S. Cl. ........................ 210/170; 210/199; 210/203; 210/266; 210/284; 405/36; 405/108; 405/129.25; 405/129.45; 405/129.65
(58) Field of Search ................................ 210/747, 170, 210/199, 202, 203, 284, 266; 405/36, 108, 129.25, 129.45, 129.57, 129.65

(56) References Cited

U.S. PATENT DOCUMENTS

| | | | |
|---|---|---|---|
| 3,713,542 A | | 1/1973 | Shaler et al. ................ 210/170 |
| 3,854,291 A | | 12/1974 | Perkins ............................ 61/2 |
| 4,473,477 A | * | 9/1984 | Beall ......................... 210/691 |
| 4,543,013 A | * | 9/1985 | Wagner et al. ............... 405/128 |
| 5,132,021 A | | 7/1992 | Alexander .................. 210/679 |
| 5,174,897 A | * | 12/1992 | Wengrzynek ................ 210/602 |
| 5,456,550 A | * | 10/1995 | Devlin ........................ 405/128 |
| 5,810,510 A | * | 9/1998 | Urriola ......................... 405/45 |
| 6,116,816 A | * | 9/2000 | Suthersan .................... 405/128 |
| 6,254,785 B1 | * | 7/2001 | Phifer et al. ................. 210/747 |
| 6,258,261 B1 | * | 7/2001 | Zaluski et al. ............... 210/170 |

FOREIGN PATENT DOCUMENTS

| | | |
|---|---|---|
| AU | 77888/91 | 10/1996 |
| EP | 0072388 | 10/1985 |
| JP | 3-004988 | 1/1991 |
| JP | 3-068489 | 3/1991 |
| JP | 4-357205 | 12/1992 |
| JP | 5-228497 | 9/1993 |
| JP | 8-229548 | 9/1996 |
| JP | 9-024369 | 1/1997 |
| JP | 9-206523 | 8/1997 |
| WO | WO97/41068 | 11/1997 |

\* cited by examiner

*Primary Examiner*—Peter A. Hruskoci
(74) *Attorney, Agent, or Firm*—Sheridan Ross P.C.

(57) ABSTRACT

Disclosed is a water treatment system (10) including:
  (a) a water permeable wall portion (12) defining a water treatment portion (18) of a waterway to be treated; and
  (b) a treating portion (20) retained in a desired position relative to the permeable wall portion (12) by retaining means (26) wherein water to be treated permeates through said wall portion (12), said retaining means (26) and said treating portion (20) for removing pollutants contained therein prior to discharge of water from the system (10).

10 Claims, 5 Drawing Sheets

WATER TREATMENT SYSTEM

FIELD OF THE INVENTION

This invention relates to water treatment systems and, in particular, to treatment of waterways and aquatic systems such as wetlands which may become subject to contamination with pollutant rich, for example nutrient rich, run off and other effluent waters. The invention further relates to an improved water treatment method.

BACKGROUND TO THE INVENTION

Waterways, such as wetlands, rivers, creeks, flood prone areas and so on are subject to various sources of pollution. Significant among these are rain or stormwater flows which may become contaminated with various contaminants and pollutants which exist in the wider environment. Key among these pollutants are the nutrients phosphorus and nitrogen present in agricultural fertilisers. Other sources of pollution include particulate matter, other organochemicals and metals.

It has been recognised that stormwater is especially polluting in the early time phase following a storm. International Patent Application No. WO 97/41068, assigned to CSF Treatment Systems Inc, identifies a "first flush" phenomenon in which high levels of contaminants are present in effluent water which sooner or later will enter waterways within the environment.

These problems have been addressed in diverse and not totally effective ways in the past. Firstly, processes and apparatus have been developed to remove contaminants where they enter the drainage system. Thus special drainage ways may be designed containing suitable reactors such as baskets containing adsorbing and adsorbent materials, especially carbonaceous materials. The cost of equipping all entry points to the drainage system in this way would be extreme.

Further downstream, processing facilities may be located to treat the bulk of water collected within the drainage system. Many different types of facility have been designed. These facilities may operate using combinations of sedimentation, flocculation, filtration and chemical reaction to remove various pollutants from the pollutant water.

There are limitations to such processing. Apart from expense, the methodology suffers the critical constraint that only water collected within a municipal drainage system will be treated. Run off, however, is a much more diffuse source of waterway contamination than this and it can be estimated that much more run off escapes "formal" treatment than is actually treated. Furthermore, treatment facilities are likely to become less efficient when surge waterflows are generated following heavy rainfall and storms. Therefore, treatment still further downstream is required.

Downstream processing is driven by the need to prevent phenomena such as algal blooms. Such blooms are highly deleterious to aquatic environments by destruction of ecosystems and reduction of the social amenity of aquatic resources. Algal blooms may be correlated with nutrient levels contained in run off entering the aquatic environment.

The most commonly encountered methodology of downstream treatment especially in wetlands is nutrient removal by plant growth. Reed beds may be planted to remove nutrients. Such processes are made difficult by the requirements of efficient plant growth, namely the requirement to provide a good soil medium in which the plants can grow. Further, once the system has reached a steady state, nutrient take-up plateaus and nutrient bypassing of the reed beds becomes an issue. The only way to address this problem is to crop the reeds or expand the treatment area. Again cost, available land and labour constraints will hinder this process.

It is a first object of the present invention to provide a water treatment system and method that will enable waterways to be treated for removal of pollutants and contaminants such as nutrients present in run-off and other sources of water discharged into the environment.

It is a second object of the present invention to allow treatment of intermittent and/or variable flow waterways.

SUMMARY OF THE INVENTION

With these objects in view, the present invention provides, in a first aspect, a water treatment system including:
(a) a water permeable wall portion defining a water treatment portion of a waterway to be treated; and
(b) a treating portion containing a treating material and retained in a desired position relative to the permeable wall portion by retaining means wherein water to be treated permeates through said wall portion, said retaining means and said treating portion for removing pollutants contained therein prior to discharge of water from the system.

The water treatment portion defines at least part of a catchment of water to be treated. The catchment may be further defined by a liner for further confinement of the water to be treated. Such a liner may be impermeable to prevent polluted water from entering the environment and may be located at the base of the waterway to be treated. A bed of treating material such as an adsorbent material may be laid over the liner to provide additional treatment to that possible in the treating portion.

The catchment need not be full or even partially full of water at any given time. The catchment may only contain water following rainfall, including storm, events. Flow through the catchment may be intermittent and/or variable and inlet flow may be controlled by man-made devices such as sluices, dams and like means. The water treatment system may be installed when conditions are dry without any water flow through the catchment at all. Accordingly, the term "waterway" where used in this specification includes rivers, creeks, drains, wetlands, floodways, flood-prone areas and the water treatment portion may be a diverted flow of water from any such waterway.

The wall portion may be an embankment, bund or dike made with a portion of a suitably permeable material. Water to be treated may, in one embodiment, permeate or flow through this portion of the wall portion to reach the treating portion and complex piping and regeneration systems are most advantageously and preferably avoided. Alternatively, water to be treated may flow through the wall following passage through the treating portion. The permeable wall portion could include permeable portions in a substantially impervious structure.

The treating portion comprises a treating material or substance which may adsorb and/or adsorb pollutants, an adsorbent material. Alternatively, or additionally, the material may react with pollutants in the water to convert them into a safer form for later safe disposal. The treating material may be the same as that used in the treating portion. Mixtures of suitable treating materials may be employed.

Any suitable adsorbent or adsorbent may be used for the application. In particular, the system is suited to treatment of wetland systems where the waterway may be contaminated by nutrient rich run-off. Such run-off may contain high phosphorus levels and high phosphorus capacity is desirable in such treating materials. The Applicant has found that granulated slag, most especially that from iron blast furnaces, is especially suitable having high capacity for adsorption of phosphorus.

Whatever the treating material used, the permeability and hydraulic properties must be such as to allow efficacious removal of pollutants without the need for involvement of expensive pumping systems. As permeability is dictated, in part, by the particle size distribution of the treating material, the particle size distribution is selected to allow the desired flowrates to be achieved without overflow from the system or requirement for expensive pumping systems to develop a necessary head to cause flow through the treating material. Adsorbent material particle sizing may be necessary to achieve this objective.

The body of the wall portion may be substantially comprised of a porous or permeable material. For example, the wall portion may be made up of rubble, spall, pebbles, rocks, bricks or like materials which may have a porosity higher than concrete. The wall material should be inert and should not be such as to itself pollute water passing through the wall portion. The wall material may itself have treatment properties, such as adsorbency, analogous to those of the treating material.

The treating portion may be retained in a desired position relative to the body of the wall portion by a retaining means or structure which itself is permeable to polluted water flow while retaining the treating material within the wall portion. Suitable means or structures may be constructed using plastic, polymeric, fabric or textile membranes which allow water through flow but which are fabricated with pore size small enough to retain the treating material in the wall portion. In a simple form, the body of the wall portion may serve a retaining function by overlaying and weighing down a retaining structure or means into position for treatment of a water flow. The retaining structure may be a water permeable envelope or "bag" which is located by the weight of the body of the wall portion. The envelope may advantageously be fabricated from a geotextile material.

The retaining structure or means may be such as to allow development of a biologically active microflora which may also be involved in the pollutant removal process. A slime or film containing the microflora may, for example, develop along a surface or surfaces of the retaining structure such as an envelope or bag which may be formed from a geotextile.

The system advantageously caters for treatment of intermittent and variable flows within the waterway to be treated. The wall portion should be capable of containing water for treatment under expected conditions within the waterway. Design parameters may be set according to worst case scenarios over a preset time period, for example ten year flood peak conditions and so on.

The containing wall portion may be provided with a spillway to allow excess water flows to be discharged from the system in such a way as to cause minimal damage to the structure. Where the bulk of the wall portion is comprised of a rock or rubble material this may be sealed, in the region of the spillway, with concrete or other suitable structural material which defines a spillway through which floodwaters may pass without severely damaging the impounding or containing wall portion.

The wall portion may be designed to create any desired form of treating portion. In a basic form, the wall portion may simply comprise a dam located to intercept a waterway to be treated. In the case of wetland treatment, more complex arrangements may be necessary as contaminated water may diffuse from the wetland around its periphery subject to local topography. In that case, the wall portion which may take the form of a dike, embankment or bund, may be arranged about a portion or all of the periphery of the wetland where contaminated waterflows are sufficiently substantial to merit treatment. Entry of water to the confined area may be controlled by man-made devices. The containing wall portion need not, of course, be located along the periphery of a wetland, it may be located to define a treating portion along a line or "contour" selected by the environmental engineer or scientist to achieve maximum benefit in terms of pollutant or contaminant removal relative to the cost of construction.

Land area available for the treatment system may be limited. Accordingly, the treating portion may be designed to be suitably confined within the area. Thus a tortuous or serpentine alignment or contour may be chosen for the wall portion which allows maximum treatment interface per unit of available land area.

The water treatment system may be located in a natural or excavated basin which may allow collection of treated water. This may be discharged at designated exit points, for example including pipes and culverts.

In a further aspect, the present invention provides a method of treating water to remove contaminants or pollutants including:

(a) confining water to be treated in a treatment portion containing a treating material with a water permeable wall portion and;

(b) causing at least a portion of the water to flow through a treating portion retained in a desired position relative to the permeable wall portion by retaining means such that pollutants are removed therefrom.

The method may be practiced in systems as described hereinabove and may adopt each of those aspects previously described.

An advantage of the system and method of the present invention is simplicity of construction and an expected higher efficiency of pollutant, especially nutrient, removal than encountered in prior art treatment methodology.

BRIEF DESCRIPTION OF THE DRAWINGS

The invention will be more completely understood from the following description of preferred embodiments thereof made with reference to the accompanying drawings in which.

DETAILED DESCRIPTION OF PREFERRED EMBODIMENTS OF THE INVENTION

Figure 1:
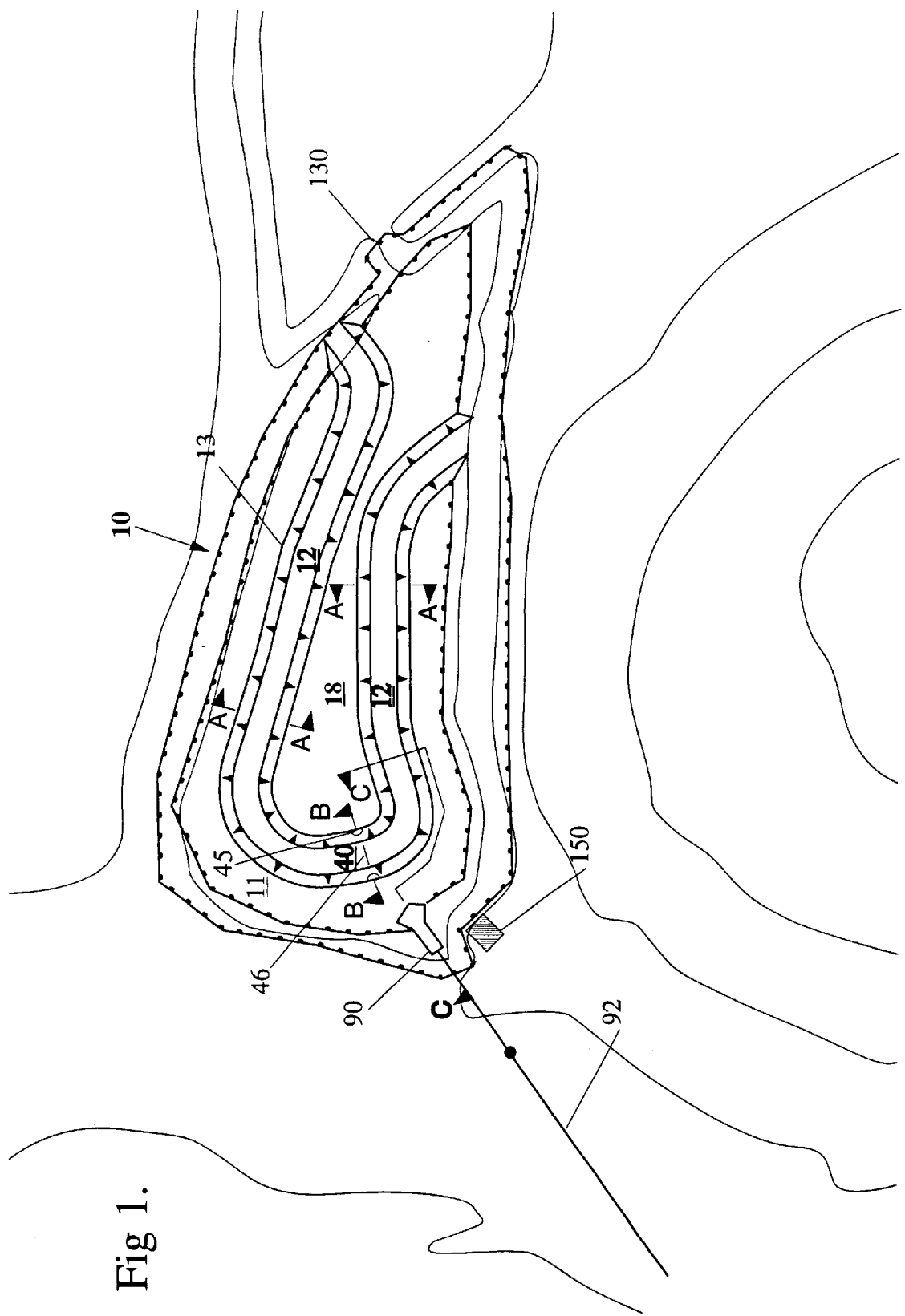
FIG. 1 is a plan view of a water treatment system in accordance with one embodiment of the present invention.
Figure 2:
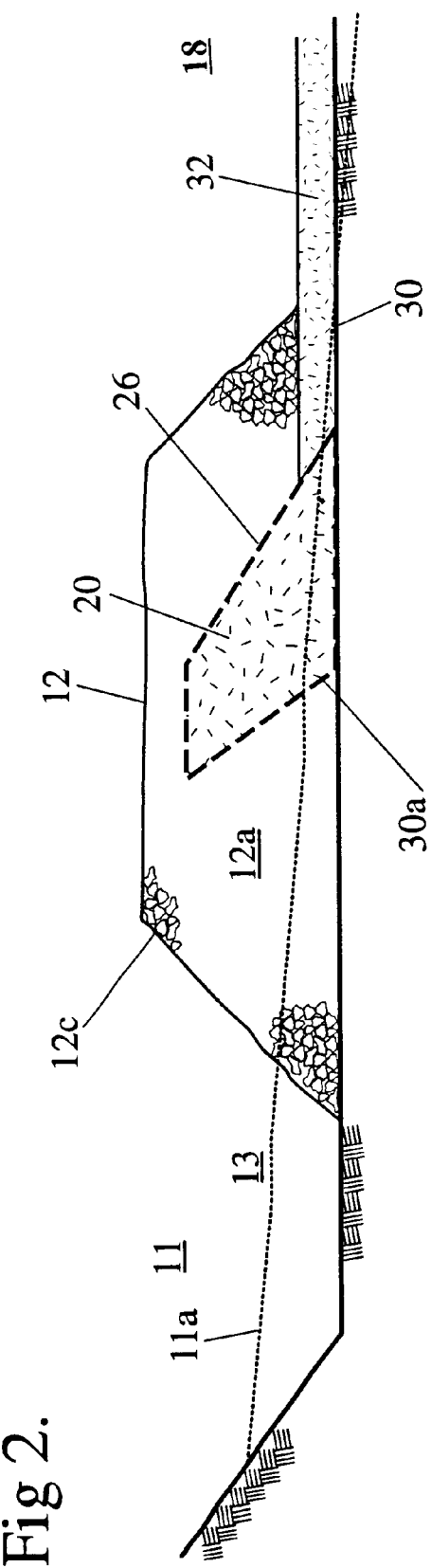
FIG. 2 is a sectional view taken along section line A—A of FIG. 1.

FIGS. 1 and 2 show a water treatment system 10 comprising a water permeable wall portion 12 defining a water treatment portion 18 of a waterway to be treated; and a treating portion 20 retained at a desired position within the wall portion 12 by retaining means 26. By a "desired position" is intended a location such that the requisite degree of treatment as set by water treatment standards or otherwise may be achieved, all other factors being equal. Water to be treated permeates through the wall portion 12 and retaining means 26 to the treating portion for removing pollutants contained therein prior to discharge of water from the system 10. FIGS. 2 to 6 provide sectional views of particular portions of wall 12.

In the preferred embodiment, as shown in FIGS. 1 to 6, the water treatment system 10 is intended to treat stormwater or floodwater which passes through a watercourse following heavy rainfall and storm events. Expected flowrates will range between 0.08 m$^3$ (2.7 ft 3/$_s$) (as shown by dashed line 110) and m$^3$ (30.9 ft 3/$_s$) 0.90 (as shown by dashed line 120). This would then set the desired flowrate parameters for system 10. Under other conditions, the watercourse may be dry or have little water flow through it. When water flows through the watercourse, it has been found typically to contain higher levels than acceptable of nutrients such as phosphorus. The prime duty of the water treatment system 10 in this non-limiting embodiment is the removal of phosphorus.

Water treatment portion 18 is a catchment for flood or stormwaters which would be expected in the watercourse in the normal course of events. The water treatment portion 18 is contained by wall portion 12 which has an alignment selected to provide a desired level of treatment of such water for nutrient removal. The alignment is tortuous or serpentine to effectively use land area for the water treatment system 10. The wall portion 12 is located in a natural or excavated basin 11 which collects treated water in channel 13.

Wall portion 12 takes the form of an embankment, dike or bund having a rock or rubble layer 12a formed from a rock material such as graded limestone spall piled such as to have high porosity and permeability. Particle size of the spall is 80–90% passing 200 mm (7.8 in). The porosity and permeability of the limestone rock construction is higher than that of concrete. Under the layer of limestone rock, as most conveniently seen in FIGS. 2 to 6, is a treating portion filled with a phosphorus adsorbent material of fine particle size distribution. The adsorbent is iron blast furnace slag granulate as such material has an especially high capacity for phosphorus as discovered by the Applicant. However, other adsorbents having acceptable phosphorus capacity and cost could, less preferably, be used. The treating portion 20 could otherwise be arranged relative to the wall portion 12.

Because the adsorbent material has fine particle size it is susceptible to wash out when water flows through the wall portion 12. Accordingly, the adsorbent material is confined within a retaining means 26 which takes the form of a water-permeable membrane of pore size sufficient to prevent wash out of any substantial quantity of treating material such as an adsorbent. The membrane 26 may be constructed from any of a wide variety of materials but geotextiles, such as those non-woven, needle-punched, continuous filament polyester geotextiles sourced from Geofabrics Australasia Pty Ltd under the trade mark "bidim A34" have been found to be suitable. The membrane 26 may be subjected to rigorous conditions in service and must be substantially puncture-proof under expected service conditions such as expected water flows. The membrane 26 may provide a habitat for microflora which are also nutrient and other contaminant fixing or removing.

The particle size distribution of the adsorbent material is important. If particle size is too small, a greater head of water will be required to ensure that water permeates through it to saturate the material and establish a treatment flow. At an extreme, very fine particle size may result in poor hydraulic characteristics and more serious washout problems. It will be understood that if the head of water becomes too high, flooding of the system 10 becomes an undesirable possibility. Therefore, the particle size distribution is selected to allow expected (desired) flows of water to flow through the material at an acceptable head of water on the water treatment portion 18 side of the wall portion 12. Appropriate sizing of material may be necessary to achieve this objective.

The acceptable head of water will define a minimum possible wall portion 12 height and the treating portion 18 is to be located within the wall portion 12 such that water to be treated does not merely bypass the treatment system. The selected area of the water treatment portion 18 will also be important to achievement of the desired head of water and will take into account expected volumes of flood and stormwater passing through the watercourse. A land constraint may be imposed by the maximum area available for the water treatment system 10. To this end, it may be found convenient to arrange the confining wall in a tortuous or serpentine shape to maximise treating portion 18 volume for a given area (reference is made to FIG. 1) thus achieving desired discharge levels of nutrients,especially phosphorus. In some circumstances, some deposition of particulates may occur during water confinement in treating portion 18.

Figure 3:
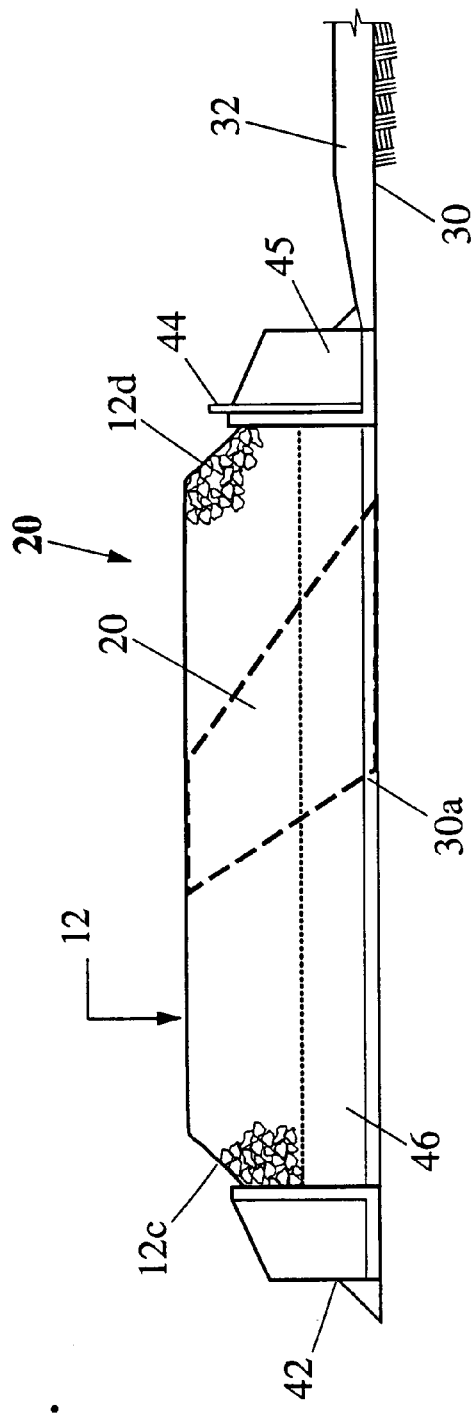
FIG. 3 is a sectional view taken along section line B—B of FIG. 1.
Figure 6:
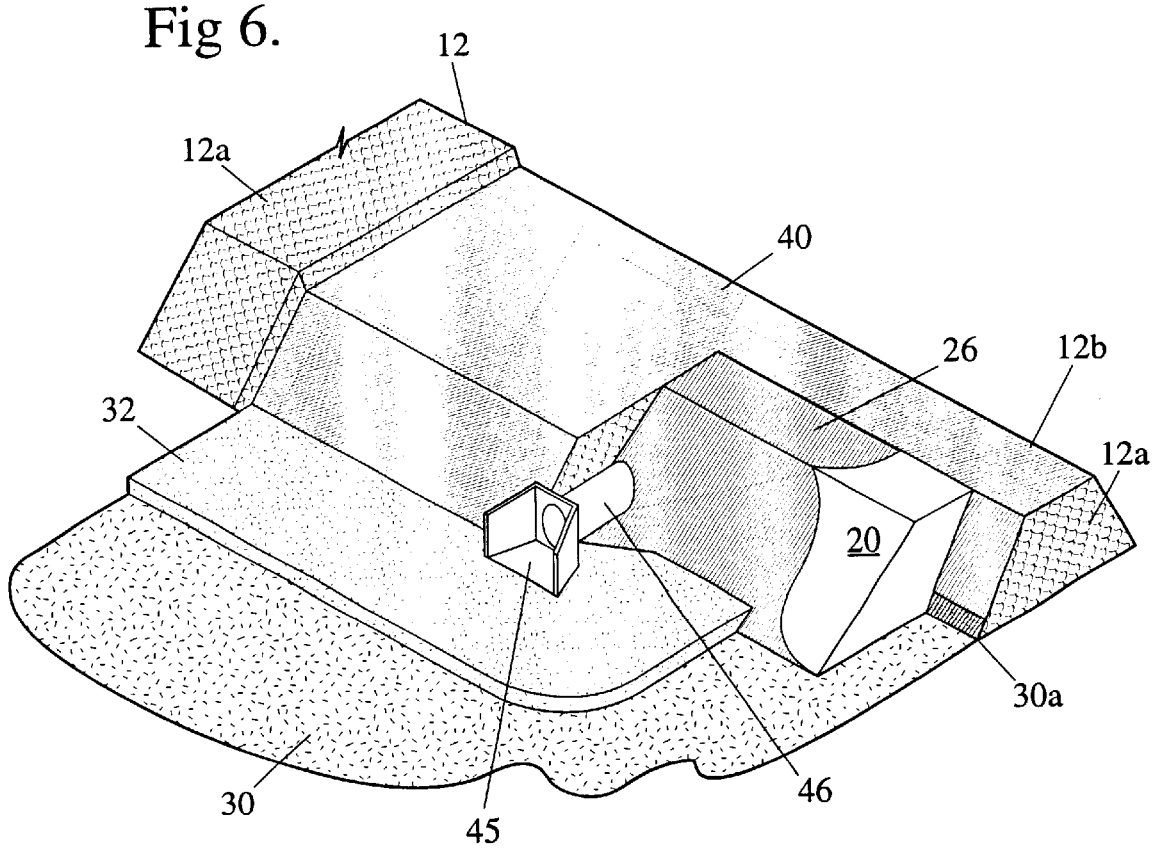
FIG. 6 is a perspective section view of a floodway of the water treatment system in accordance with the embodiment of FIGS. 1 to 5.

At one end of the wall portion 12 is defined a floodway 40, as shown in FIGS. 3 and 6. The floodway 40, which may also be referred to as a spillway, is best located where maximum head of water is expected. It is provided with the understanding that flood conditions may occur which may not allow water to be fully treated by the system 10. In that case, it remains desirable to minimise flood damage to the system 10 and a path is provided for such floodwater to be discharged from it. The floodway 40 is similar in structure to wall portion 12 but is constructed at lower height, 1.4 m (4.55 ft), but the wall portion 12b is sealed being concreted over with waterproof concrete, available under the trademark "Spraycrete", to a depth of 50 mm to prevent dislocation of the rock layer 12a in that area. Floodwaters may be discharged through sump 45, discharge pipe 46 into culvert 42 and removable stopboards 44 may be located on the water treatment portion 18 side of wall portion 12 to prevent flow into discharge pipe 46 at other times.

Water levels and contaminant or pollutant levels may be monitored at gauging station 150 using suitable instrumentation.

Figure 4:
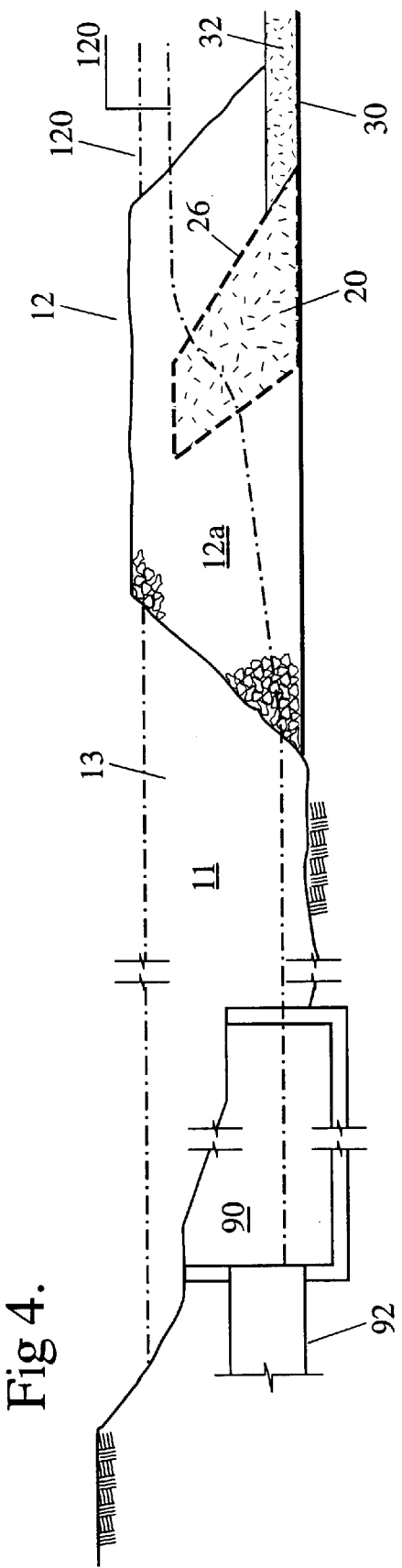
FIG. 4 is a sectional view taken along section line C—C of FIG. 1.
Figure 5:
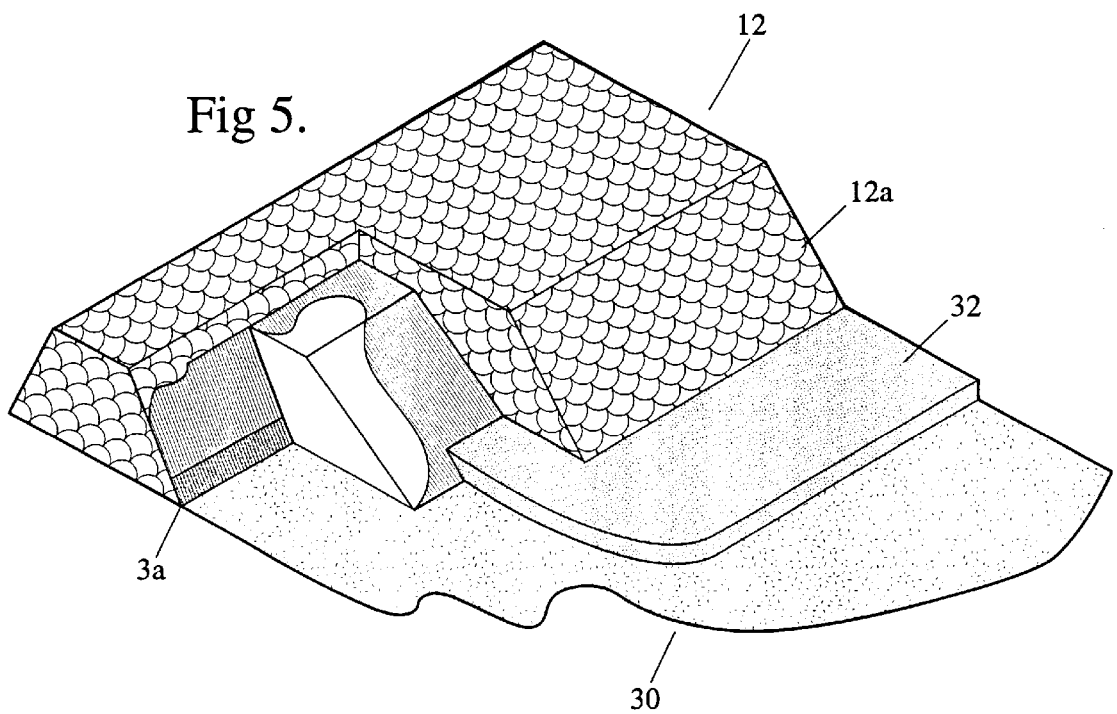
FIG. 5 is a perspective section view of a wall of the water treatment system in accordance with the embodiment of FIGS. 1 to 4.

Water otherwise discharged from the water treatment system 10 may be collected into a pipe 92 at culvert 90 as shown in FIG. 4. Culvert 90 is of conventional construction and the pipe 92 maybe fabricated from "helicor" of appropriate diameter.

On constructing the system 10, the defined area for the water treatment portion 18 is cleared and suitably shaped, for example by levelling or excavation. As may be seen a natural basin 11 has been partially excavated for this purpose as shown by dashed line 11a showing the natural basin level. A base liner 30 impermeable to water may be laid along it. The liner 30 is an optional component but further confines any water flow and prevents contaminant flow and is laid in position. The base liner 30 should be puncture-proof under expected service conditions. Polymeric materials, such as 500 micron thick PVC sheet, may be used for the duty.

First of all, a supporting wall, dike, bund or embankment of limestone spall is constructed along the selected alignment for wall portion 12. This alignment or contour may be selected having regard to expected water flow profile or other factors. Adjacent the supporting wall is laid the geotextile intended to form membrane 26.

The adsorbent material which will form the treating portion 20 is then heaped to the required height relative to the design height of the wall portion 12. Materials other than limestone spall or spall could be used. Crushed or graded rock or stone are suitable. Gabions could be employed. The geotextile membrane 26 is then overlaid, and tucked under, the treating portion 20 overlapping liner 30 which tucks up about the membrane 26 at 30a to provide sealing. The graded limestone spall to form the rock layer 12a of the wall portion 12 is then heaped on top of the treatment portion 20 to the design height of the wall portion 12 and compacted. By way of example only, the height of the wall is 1.8 m (5.85 ft) and the top width of the wall 12 is 4 m (13 ft). The wall portion 12 has sloping faces 12c and 12d having an angle of about 45° to horizontal. These dimensions must be specifically calculated for each system. The rock layer 12a also helps to keep the treating portion 20 in desired position. The construction operation is therefore a simple and relatively inexpensive operation.

Adsorbent material may also be laid over the liner 30 to form a secondary adsorbent layer 32, for example to a depth of 0.3 m (11.7 in). As permeability is not so important for the secondary adsorbent layer 32, the adsorbent material may be selected with a finer particle size distribution than would be acceptable for the treating portion within wall portion 12. The adsorbent material used in the secondary adsorbent layer 32 may be of the same or different nature to that used in treating portion 20.

As the system 10 is located in basin 11, a channel 13 of about 2 m (6.5 ft) width surrounds wall 12 as shown in FIGS. 1 and 2. This collects treated water. Such a channel 13 is not essential. Other water collection means could be employed, as desired.

The construction of water treatment system 10 may be required in a waterway which is flowing or subject to flow. A dam 130 may be constructed at a suitable location to prevent flow into the construction area as shown in FIG. 1.

Figure 7:
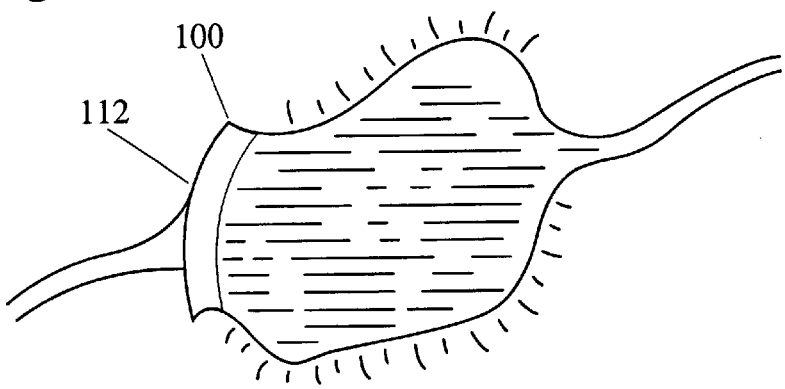
FIG. 7 is a schematic arrangement of a water treatment system in accordance with a further embodiment of the present invention.

Referring now to FIG. 7, there is shown a schematic view of a further embodiment of the water treatment system of the present invention. In this case, water treatment system 100 takes the form of a dam 112 at the downstream end of a watercourse such as a creek. The dam 112 may be limited in extent as topography defines a valley in which water flows. Construction of the dam 112 is, however, in accordance with that described for the wall portion 12 made with reference to FIGS. 1 to 3.

Modifications and variations to the water treatment system and method may be apparent to the skilled reader of this disclosure. Such modifications and variations fall within the scope of the present invention. For example, the treating portion 20 may be maintained in a desired position on the untreated side of the body of the permeable wall portion 12 and adjacent thereto. Water to be treated permeates through the retaining means, the treating portion and the wall portion 12 to be discharged from the water treatment system.

It may also be possible to develop adsorbent materials that may be retained in a desired position relative to the wall, integrating the retaining means feature with adsorbency.

In any event, the system is a flexible one that may be used in co-operation with other water management and treatment strategies for optimum performance.

What is claimed is:

1. A water treatment system comprising:
   (a) an embankment defining a water treatment portion of a waterway to be treated and having a water permeable wall portion, and
   (b) a treating portion comprising a treating material and retained in a desired position relative to said water permeable wall portion by retaining means wherein said treating material comprises an adsorbent material, and said retaining means is an envelope of permeable material, said envelope being retained in place in said embankment by an overlying wall portion of said water permeable wall portion which weighs down said envelope;
   wherein water to be treated permeates through said water permeable wall portion, said retaining means and said treating portion, thereby removing pollutants in water prior to discharge of the water from said system to a portion of said waterway downstream from said embankment.

2. The system of claim 1, wherein said water treatment portion of said waterway is further defined by a liner, and wherein said liner is provided at least at a base of said water treatment portion of said waterway.

3. The system of claim 2, wherein an adsorbent layer is arranged above said liner at the base of said water treatment portion of said waterway.

4. The system of claim 1, wherein said adsorbent material is granulated iron blast furnace slag.

5. The system of claim 4, wherein said granulated iron blast furnace slag has a particle size distribution selected to allow achievement of a desired water flowrate.

6. The system of claim 1, wherein said embankment is substantially comprised of at least one material selected from the group consisting of rubble, spall, pebbles, rocks and materials having a porosity higher than concrete.

7. The system of claim 1, wherein said envelope comprises a polyester geotextile having pore size selected to prevent washout of any substantial quantity of said treating material.

8. The system of claim 1, wherein said water treatment portion is confined by a wall portion of tortuous contour.

9. The system of claim 1, further comprising a sealed spillway wall portion for allowing overflow of water.

10. A water treatment system comprising:
    (a) an embankment defining a water treatment portion of a waterway to be treated, said embankment having a water permeable wall portion comprising a material selected from the group consisting of rubble, spall, pebbles, rocks, materials having a porosity higher than concrete, and mixtures thereof; and
    (b) a treating portion comprising granulated iron blast furnace slag having a particle size distribution selected to allow achievement of a desired water flowrate and retained in an envelope comprising a polyester geotextile having pore size selected to prevent washout of any substantial quantity of said granulated iron blast furnace slag wherein said envelope is retained in place in said embankment by an overlying wall portion of said water permeable wall portion which weighs down said envelope;
    wherein water to be treated permeates through said water permeable wall portion and said treating portion, thereby removing pollutants in water prior to discharge of the water from said system to a portion of said waterway downstream from said embankment.

* * * * *